Figure 1:
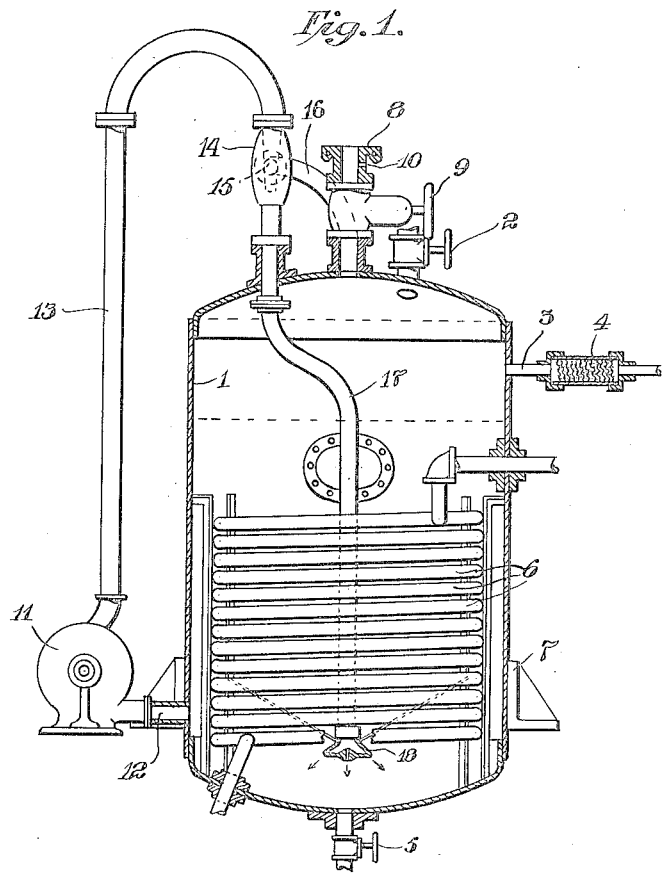

C. ELLIS.
APPARATUS FOR TREATING OILS AND THE LIKE WITH GASES, &c.
APPLICATION FILED APR. 15, 1913.

1,084,203.

Patented Jan. 13, 1914.

Attest:

Inventor:
Carleton Ellis

UNITED STATES PATENT OFFICE.

CARLETON ELLIS, OF MONTCLAIR, NEW JERSEY.

APPARATUS FOR TREATING OILS AND THE LIKE WITH GASES, &c.

1,084,203.  Specification of Letters Patent.  Patented Jan. 13, 1914.

Application filed April 15, 1913. Serial No. 761,236.

*To all whom it may concern:*

Be it known that I, CARLETON ELLIS, a citizen of the United States, and a resident of Montclair, in the county of Essex and State of New Jersey, have invented certain new and useful Improvements in Apparatus for Treating Oils and the like with Gases, &c., of which the following is a specification.

This invention relates to an apparatus for hydrogenating oily material and the like, containing unsaturated bodies, and relates in particular to an apparatus for treatment of a body of oil with hydrogen or a hydrogen-containing gaseous medium, involving the passage of the gas preferably in relatively fine bubbles through said body of oil; and this application is a continuation in part of my former copending application Serial No. 737,942, now matured into Letters Patent No. 1,059,720, of April 22, 1913.

In the present invention I make use preferably of two common expedients, namely that of stirring a liquid by means of a gas passing through it and the use of pressure to accelerate reactions between liquids and gases, but I embody with these aforesaid expedients a certain novel method of operation as will hereinafter be described.

In the present invention I may subject the oil to a pressure which is frequently variable in amount, although the variation is preferably slight and definite and of a positive nature. To this end I may expose a body of oil to an atmosphere of hydrogen and cause a portion of the oil to pass preferably under a substantial pressure through an injector in such a manner that the hydrogen gas is drawn into contact with the oil so that without the formation of a powerful spray or violent mechanical agitation the hydrogen is brought into solution in the oil to the required degree. During the period of induction the oil and gas are subjected momentarily to reduced pressure which may cause the elimination more or less of tiny or microscopic bubbles of hydrogen which may become attracted to the oily particles of catalyzer and cling to same by adhesive forces until absorbed through the film of oil by the catalyzer and then given back to the oil as fixed hydrogen. Thus I preferably maintain conditions such that the particles of catalyzer carry a zone of nearly saturated or even supersaturated solution of hydrogen in the oil around about each particle.

The oil is contained in a hydrogenating receptacle which is preferably heated by a steam coil and hydrogen is introduced into this tank under any suitable pressure, it being desirable to heat the oil and blow hydrogen through it for a short time to remove moisture and air. Catalyzer is prepared in a separate chamber consisting, for example, of a drum which is caused to rotate in a housing heated to 300 or 350° C. while hydrogen is passed over same. The drum of catalyzer may then be tightly closed, carried to the hydrogenation receptacle, screwed into a threaded opening in the latter and the contents allowed to fall into the receptacle without contact with the air, as even momentary exposure to the air is sometimes fatal of good results. The oil is heated and a portion passed in cyclic fashion through an inductor so as to introduce hydrogen from the top into the bottom of the receptacle and the hydrogen entering in this way at the bottom is so mingled with the oil that relatively fine bubbles of the oil are formed particularly conducive to rapid absorption. In the inductor it is desirable to avoid the formation of spray and the stream of oil passing through inductor preferably should therefore be as nearly solid or integral as possible so as to avoid separating the gas in solution in the oil.

The accompanying illustrative drawings show in a diagrammatic manner apparatus suited for carrying out the present invention.

Figure 2:
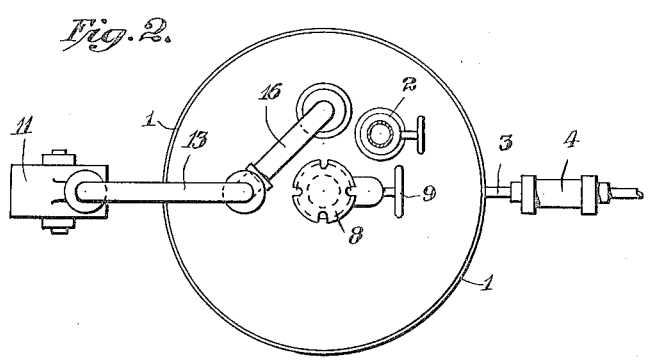

Figure 1 shows mainly in vertical section a treating receptacle and its appurtenances. Fig. 2 is a plan view of Fig. 1.

Like reference characters denote like parts in the drawings.

In the drawing 1 is a treating receptacle having the inlet 2 for oil or catalyzer; a hydrogen inlet 3; back flash tube 4; a draw-off valve 5; a steam heating coil 6; supporting members 7; a catalyzer inlet 8 adapted to hold capsules of catalyzer; a valve 9 in said inlet 8; a flush-out opening 10 which is provided with a removable plug not shown. 11 is a pump connected with the lower part of the tank by the pipe 12 and having a discharge pipe 13 extending to an inductor 14 which is in communication by means of the inlet 15 and pipe 16 with the top of the treating receptacle 1. From the inductor the pipe 17 extends nearly to the bottom of the receptacle and terminates in a distributer 18 which is so arranged that the flow of material therethrough is both down and angularly against the bottom of the tank or receptacle.

In the operation of this apparatus hot or cold oil is placed in the tank to fill same to about the level indicated. The temperature is raised to about 200° F. or higher and hydrogen or hydrogen-containing gas may be entered at 3 to flush out all the air. Catalyzer may then be entered through the inlet pipe 10. Pressures of 2 or 3 atmospheres or so may be employed if desired, which has a tendency to steady the oil stream passing through the inductor. Oil carrying catalyzer segregated from the main body of oil, is pumped through the pipe 13 and enters the inductor as an integral stream. As this stream passes through the inductor hydrogen is drawn in and is carried along through the depending tube to the lower part of the tank where both oil and gas emerge, the latter to bubble through the oil pool and the former in the course of time to again pass through the inductor via the pump 11. The catalyzer which might otherwise tend to settle on the bottom of the tank is impelled by the impinging stream of oil away from the bottom and maintained in the body of oil by the bubbling effect of the preferably strong current of hydrogen which passes through the body of oil.

What I claim is:

1. An apparatus for treating oils with hydrogen or a hydrogen containing gas which comprises a closed receptacle adapted to contain a gas under pressure and to contain a body of oil; means for maintaining the body of oil at any desired temperature; an inductor situated above the body of oil; a pipe connecting the zone of suction of said inductor with the top of the receptacle; means for removing oil from said receptacle and impelling it through said inductor whereby gas and oil become entrained; means for passing mixture to the bottom of the tank and discharging same in such a manner as to impinge upon the bottom of said tank.

2. An apparatus for treating oils with hydrogen or a hydrogen-containing gas which comprises a closed receptacle adapted to contain a gas under pressure and to contain a body of oil; means for maintaining the body of oil at any desired temperature; an inductor attached to said receptacle; a pipe connecting the zone of suction of said inductor with the gas space of said receptacle; means for removing oil from said receptacle and impelling it through said inductor whereby gas and oil become entrained; means for passing the mixture to the bottom of the tank and discharging same in such a manner as to impinge upon the bottom of said tank.

3. An apparatus for treating oils with hydrogen or a hydrogen-containing gas which comprises a closed receptacle adapted to contain a gas under pressure and to contain a body of oil; means for maintaining the body of oil at any desired temperature; an inductor attached to said receptacle; a pipe connecting the zone of suction of said inductor with the gas space of said receptacle; means for removing oil from said receptacle and impelling it through said inductor whereby gas and oil become entrained; and means for passing the mixture to a point near the bottom of the receptacle.

4. Apparatus for treating oils and the like with gases or vapors as for hardening fatty oils and the like which comprises a closed receptacle adapted to contain a body of oil and means for inductively propelling the gas or vapor through the contents of the receptacle; said contents being maintained in a liquid condition.

Signed at Montclair, in the county of Essex and State of New Jersey, this 8th day of April, A. D. 1913.

CARLETON ELLIS.

Witnesses:
B. M. ELLIS,
F. CARBUTT.